United States Patent
Bladon et al.

(10) Patent No.: US 7,703,290 B2
(45) Date of Patent: Apr. 27, 2010

(54) AIR THRUST BEARING FOR A GAS TURBINE ENGINE

(75) Inventors: Christopher George Bladon, Ellesmere (GB); Paul Douglas Bladon, Ellesmere (GB); Heather Elizabeth Bladon, legal representative, Ellesmere (GB)

(73) Assignee: Bladon Jets (UK) Limited, Ellesmere (GB)

( * ) Notice: Subject to any disclaimer, the term of this patent is extended or adjusted under 35 U.S.C. 154(b) by 414 days.

(21) Appl. No.: 10/546,883

(22) PCT Filed: Feb. 26, 2004

(86) PCT No.: PCT/GB2004/000756

§ 371 (c)(1),
(2), (4) Date: Aug. 18, 2006

(87) PCT Pub. No.: WO2004/076821

PCT Pub. Date: Sep. 10, 2004

(65) Prior Publication Data
US 2007/0039330 A1 Feb. 22, 2007

(30) Foreign Application Priority Data
Feb. 26, 2003 (GB) .................. 0304320.5

(51) Int. Cl.
*F02C 9/18* (2006.01)
*F16C 32/00* (2006.01)
*F01D 25/16* (2006.01)

(52) U.S. Cl. .................... 60/804; 60/785; 415/107
(58) Field of Classification Search .............. 60/785, 60/804; 415/104, 106, 107
See application file for complete search history.

(56) References Cited

U.S. PATENT DOCUMENTS

| 2,399,046 | A | * | 4/1946 | Larrecq | 60/785 |
|---|---|---|---|---|---|
| 2,746,671 | A | * | 5/1956 | Newcomb | 415/115 |
| 2,926,050 | A | * | 2/1960 | Battle | 415/104 |
| 4,838,710 | A | * | 6/1989 | Ohta et al. | 384/100 |
| 5,791,868 | A | * | 8/1998 | Bosley et al. | 415/107 |
| 5,827,040 | A | * | 10/1998 | Bosley et al. | 415/106 |
| 6,286,303 | B1 | * | 9/2001 | Pfligler et al. | 60/805 |
| 6,455,964 | B1 | * | 9/2002 | Nims | 310/90 |
| 6,494,620 | B1 | * | 12/2002 | Sawaguchi et al. | 384/107 |

FOREIGN PATENT DOCUMENTS

JP 06-264769 * 9/1994

* cited by examiner

*Primary Examiner*—Ted Kim
(74) *Attorney, Agent, or Firm*—Ober/ Kaler; Royal W. Craig

(57) ABSTRACT

A gas turbine engine comprises a rotary compressor (6) which is subject to forward thrust forces and is mounted on an axial shaft (50) which has a forward facing surface (67) located in a thrust bearing (52). A bleed of air under pressure (70, 74, 78) is provided from the compressor to the thrust bearing to form an air cushion (66, 68) opposing the forward thrust of the compressor transmitted by the shaft. The air cushion pressure automatically increases with engine speed. Other air cushion bearings (54, 56) are also provided along the shaft.

19 Claims, 1 Drawing Sheet

AIR THRUST BEARING FOR A GAS TURBINE ENGINE

Figure 1:
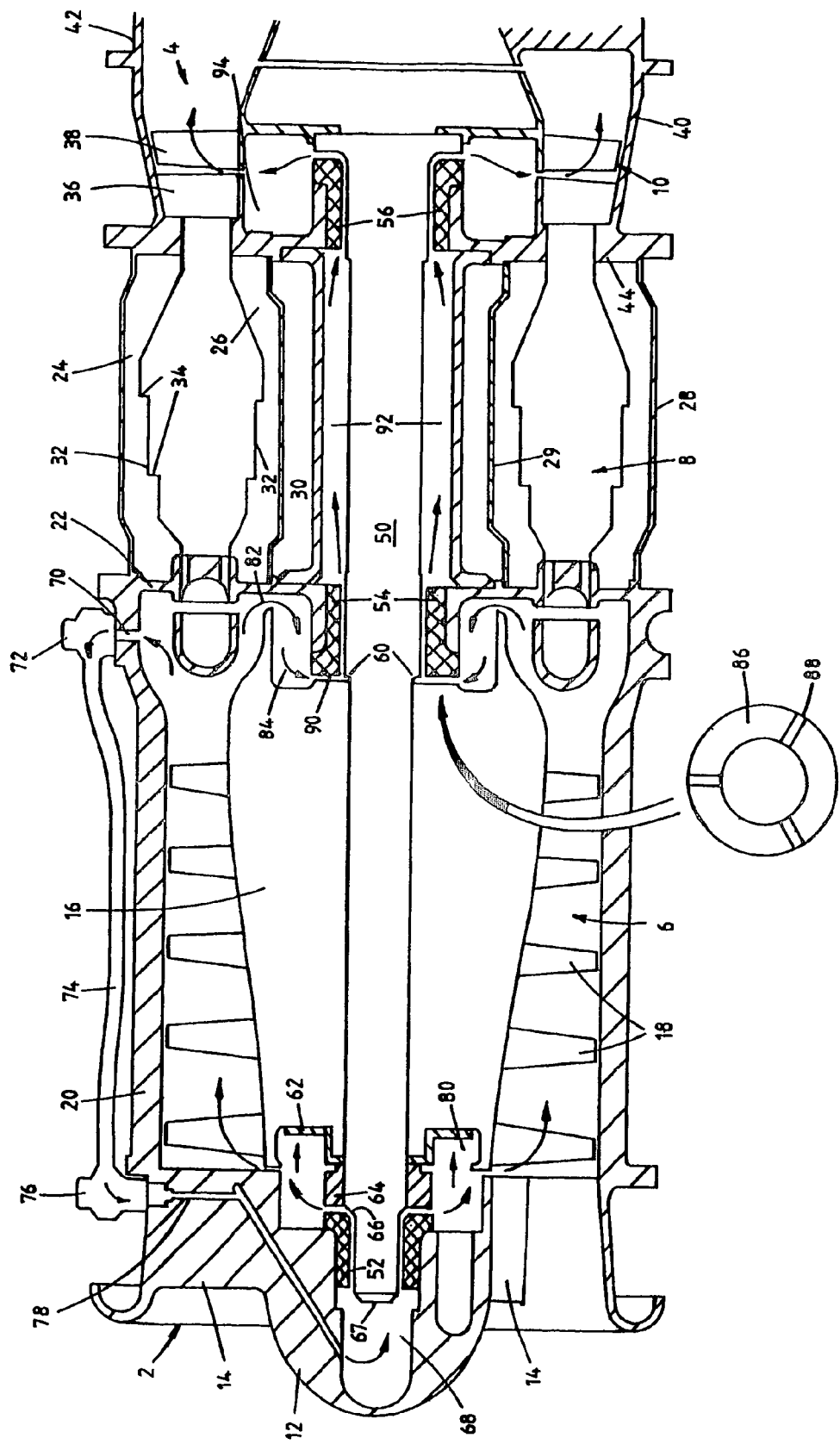

This invention relates to gas turbine engines.

Gas turbine engines are a widely used form of internal combustion engine and are in many senses more efficient than reciprocating engines operating on the two- or four-stroke principle. In particular, for a given size, the gas turbine can give a higher power output.

Much gas turbine development has concentrated on relatively large power plants for large power outputs, exemplified by turbojet and turbofan engines for aeronautical use. In scaling down the size of such engines, engineering problems are met as dimensions decrease. Some of these problems are to do with the difficulties of further miniaturisation at a manufacturing level, and some to do with the behaviours of gas flows in relatively small spaces.

The present invention addresses aspects of gas turbine engine construction that are particularly applicable to very small gas turbines. Such engines are exemplified by the particular embodiment given as an example herein, where the invention is applied to a turbojet engine with an overall diameter of about 10 cm and length of about 32 cm, developing 110N (27 lb) of thrust at an engine speed of 90,000 rpm.

In the general form of a gas turbine, a rotary compressor raises the pressure of intake air. At least some of the pressurised air is passed to a combustion chamber or chambers where fuel is burned. Exhaust gases from the combustion chamber(s) drive a turbine as they pass to an exhaust nozzle. The turbine drives the compressor by an engine shaft, which is normally axial to both the compressor and the turbine, and connects the two, with or without gearing. Forward thrust forces load the compressor stage, while rearward thrust forces are applied to the turbine. Thus the shaft is in tension; and especially when the turbine design allows a substantial forward thrust to be given by the exhaust gases, the shaft is subject to a net forward force.

Conventionally, a location bearing is provided on the shaft at a suitable intermediate position to counter the axial force on the shaft. Since the net forces vary with engine output, a pressure balance seal may be provided in front of the location bearing to control the loading on the location bearing over the engine thrust range, by using internal air pressure to provide supplementary thrust on the shaft in a forward direction.

There are of course many other bearings for the engine shaft, which demand a lubrication system, including an oil pump and oilways.

One object of the present invention is to simplify the bearing and lubrication system for a gas turbine engine, to reduce weight and to enable effective miniaturisation.

In accordance with one aspect of the present invention, a gas turbine engine comprises a rotary compressor subject, in use, to forward thrust forces, mounted on an axial shaft, wherein the shaft has a forward facing surface located in a thrust bearing, and a bleed of air under pressure is provided from the compressor to the thrust bearing, whereby to form an air cushion opposing the forward thrust of the compressor transmitted by the shaft.

As the engine speeds up, and thrust develops, air is compressed more by the compressor, so the bleed air pressure automatically changes likewise, and with correct design the air cushion is maintained at all operating speeds. To the extent that shaft thrust and air pressure do not change in direct proportion, the shaft is allowed sufficient end float to compensate. In any event, a certain end float is desirable to accommodate thermal expansion of the shaft relative to the engine casing, and changes in length under varying internal tension.

In a preferred arrangement, an increase in the air cushion thickness (whether due to a change in shaft length or in net thrust) is accompanied by an increase in venting from the air cushion. Thus, a decrease in end thrust allows the high pressure air to escape faster from the thrust bearing, reducing the air pressure resisting the thrust; and an increase in end thrust tends to advance the shaft axially into the thrust bearing, which reduces the air venting, allowing the air cushion pressure to rise and counter the axial thrust. In this way, the air thrust bearing acts to stabilise the axial location of the compressor shaft. In a typical engine, the exhaust turbine is actually or at least effectively mounted on the same shaft.

The frontal area of the forward facing surface on the shaft, multiplied by the maximum air pressure available from the compressor, equals the net thrust on the shaft that can be balanced.

The engine shaft will normally be located in the engine by bearings that control both the tendency to axial movement of the shaft within the engine and the tendency to lateral or radial movement of the shaft within the engine. Pressurised air can be used in bearings for both purposes. According to a preferred aspect of the invention, a bleed of air under pressure is provided from the compressor to a plurality of bearings, and optionally every bearing, on the engine shaft, to form an air cushion or air film at each, whereon moving parts can float over each other with no substantial contact during operation, except at start-up before pressure has built up in the compressor. In this way, the in-built air compression system of the gas turbine allows a separate oil lubrication system to be dispensed with. The benefits include a saving in weight and complexity, and the avoidance of any need to miniaturise an effective oil lubrication system.

Bearing faces may be of low friction material, such as graphite, to accommodate start-up conditions.

The air bleed can be taken from any suitable stage of the compressor according to the desired air pressure. A pressure control valve may be provided if required.

Advantageously, the engine comprises a continuous chain of interconnected air passageways from the compressor to an exhaust outlet. These passageways lead the pressurised bearing air through the said bearings in sequence. In an engine with a compressor, followed coaxially by a combustion chamber or ring of combustion chambers, and an exhaust turbine, radial location bearings may be provided for the shaft at its forward end before the compressor, at an intermediate position between the compressor and the combustion chamber or chambers, and between the combustion chamber or chambers and the turbine. At any such position the shaft may have axial (forward or rearward) facing surfaces which may form part of an air thrust bearing in accordance with the invention. Any surface on which a pressure force is resolvable into an axial force component, such as conical surfaces as well as end faces and perpendicular shoulders on the shaft, may be used in a thrust bearing.

One embodiment of the invention is illustrated by way of non-limiting example in the accompanying drawing, which is a schematic cross sectional view along the centre of a gas turbine jet engine, with an inset detail of a bearing end face.

Gases flow through the engine from left to right, as illustrated, from an air intake 2 to an exhaust 4, by way of any axial flow compressor 6, an annular combustion chamber 8, and a turbine 10.

The air intake 2 surrounds a central nose cone 12, which is supported within the air intake by three radial webs 14 spaced at 120° intervals.

The compressor comprises a rotary core 16 carrying a plurality of axially spaced apart sets of compressor blades 18.

Five sets of blades are shown in the drawing, but a different number may be used. The blades rotate with compressor core 16. Between each set of blades is a set of fixed stator vanes (not shown, for clarity) which are attached to compressor casing 20. The combination of one set of rotary blades and one set of stator vanes makes up one stage of the compressor, and there are as many stages as there are blades and vanes. Each stage compresses intake air further, for which reason the rotary core 16 increases in diameter from stage to stage.

The compressor is followed by combustion chamber inlet bulkhead 22 which contains fuel nozzles to inject fuel into the combustion chamber 8, and air inlet vents to accept compressed air from the compressor into the combustion chamber, and also into cooling spaces 24, 26 surrounding the combustion chamber, between combustion chamber outer casing 28 and combustion chamber inner casing 29. In a conventional manner, air from the cooling spaces cools the combustion chamber walls 32 both on the outside of the combustion chamber, and on the inside through the provision of apertures in the walls, distributed along steps 34 and over the tapering rear portion of the combustion chamber.

Rearward of the combustion chamber 8, combustion products from the combustion chamber, and air from cooling spaces 24, 26, pass through fixed guide vanes 36 before impinging on turbine blades 38, causing turbine 10 to rotate, inside turbine casing 40, before passing to exhaust 4 within exhaust casing or jet nozzle 42.

The rotary compressor core 16 is mounted on the forward portion of engine shaft 50, and turbine 10 is mounted on the rear of the engine shaft. In this instance, the shaft is of unitary construction, but a built-up shaft made be used. The combustion gases exiting through turbine blades 38 cause the turbine to rotate, the turbine rotates the shaft, and the shaft rotates the compressor.

The engine thus far described is essentially conventional in concept.

In accordance with the invention, pressurised air from the compressor 6 is used to provide effectively self lubricating bearings for engine shaft 50.

As illustrated, engine shaft 50 is carried in three bearings. These are a nose bearing 52 in the nose cone 12, an intermediate bearing 54 in the combustion chamber inlet bulkhead 22, and a tail bearing 56 within combustion chamber exhaust bulkhead 44.

At a position corresponding to the forward end of intermediate bearing 54, the diameter of engine shaft 50 changes, at shoulder 60. Forward of the intermediate bearing the shaft is of a slightly smaller diameter. This portion of the shaft carries rotary compressor core 16, clamped between shoulder 60 and clamping washer 62 by the action of nut 64 engaged with a threaded portion of the engine shaft at that point. Suitable key means may be provided if necessary, to ensure that compressor core 16 is solid with shaft 50 and rotates with it, without slippage.

Ahead of nut 64, shaft 50 narrows again, this time at conical bearing shoulder 66, forward of which a final short length of shaft is received within and supported by nose bearing 52. The shaft has a flat, forward end face 67 which is exposed to axial void 68 in the nose cone ahead of the shaft.

After the final stage of the compressor 6 the inlet air has been compressed to a maximum pressure, in this example about 270 kPa (40 psi). An outlet 70 is provided in the compressor casing 20 where an outlet union 72 is connected by external air pipe 74 to an inlet union 76 on the air intake, connecting compressed air from compressor final stage to internal airway 78 in one of the three webs 14 supporting the nose cone. Airway 78 leads the compressed air to the nose cone axial void 68, where, it forms a pressurised air cushion, exerting pressure on shaft end face 67. If the maximum end thrust on shaft 50 is 110N (27 lbs), an end face area of 4.4 cm$^2$ (0.68 square inches) is theoretically sufficient to prevent forward movement of the shaft.

In practice, a thin film of air escapes from the air cushion in void 68 between the nose portion of shaft 50 and the surrounding bearing 52. Nose bearing 52 has an internal shape which is complimentary to the external shape of the shaft, including conical nose bearing shoulder 66. It is at this conical region that the limit of forward movement of shaft 50 is determined. If the shaft moves sufficiently far forward to close the air gap in this region, pressure in void 68 builds up to compressor pressure until the shaft is forced rearwardly, allowing air to vent at the conical shoulder. Effectively, the shaft position is maintained with venting of a thin lubricating air film at shoulder 66 once the engine is running fast enough for the compressor to build up sufficient air cushion pressure in the nose cone axial void.

All three bearings 52, 54 and 56 are made of temperature resistant low friction material, such as graphite, and the corresponding parts of shaft 50 that may come in contact with those bearings are made of hard abrasion resistant material such as titanium nitride. Typically, the shaft is titanium and it is nitride coated in these regions. Mechanical contact between the rotating shaft with its potential axial movement and the fixed carbon bearings is avoided by air films during continuous operation, but some contact during start up and shutdown is unavoidable.

Air escaping past shoulder 66 is collected in annular receiving void 80, where, as indicated by the arrows, it exerts further pressure on clamping washer 62 before escaping into the first stage of the compressor, where it is then recompressed.

After the compressor final stage there is also a radially inwardly directed vent gap 82 leading to annular feed void 84 for the intermediate bearing 54. The intermediate bearing has a flat front face 86 (see insert) which is divided into three equal sectors by three grooves 88 at 120° intervals. Bearing face 86 opposes a flat rear face 90 of compressor core 16, and pressurised air from the compressor flows between these faces to afford an air film bearing. Grooves 88 provide means for initiating airflow in the event that, on start up, there is contact between faces 86 and 90 which would otherwise prevent any air ingress to drive the two apart.

An air film is formed between shaft 50 and bearing 54 as air flows through the bearing. The air exits into cylindrical space 92 between shaft 50 and centre tube 30 of the combustion chamber section, and flows rearward to tail bearing 56 where it passes as a further lubricating air film between the bearing and shaft 50 before exiting into annular exhaust void 94 and vents out past turbine blades 38 to exhaust 4.

In the embodiment described, the engine shaft 50 and the rotary elements of the compressor 6 which it carries are maintained in position and lubricated, in a non contact manner, in the three bearings 52, 54 and 56, at all times when the engine is running at speed, with no need for additional provision for lubrication or mechanical roller or ball race bearings. The arrangements offers high efficiency, considerable saving in weight and great simplicity of manufacture, with corresponding cost reductions and performance enhancement.

The invention claimed is:

1. A gas turbine engine comprising a rotary axial-flow air compressor mounted on an axial shaft for generating a bleed of air under pressure, and a turbine, said axial shaft having a forward end in advance of the air compressor and a rearward end, said forward end being defined by a forward facing surface located in a void in advance of the air compressor to form an air thrust bearing, said turbine being located between the compressor and the rearward end of the axial shaft, a pressurized air cushion maintained by said bleed of air from the compressor to the thrust bearing, said pressurized air cushion opposing only the forward thrust of the compressor transmitted by the axial shaft, said axial shaft having a degree of forward end float to allow said forward facing surface to move axially within said void to thereby compensates for relative changes between the air pressure in the air cushion and the forward thrust transmitted by the shaft.

2. A gas turbine engine as claimed in claim 1 wherein an increase in air cushion thickness is accompanied by an increase in venting from the air cushion.

3. A gas turbine engine as claimed in claim 1 wherein the said forward facing surface is the forward end face of the axial shaft and the air cushion is in an axial void ahead of the shaft.

4. A gas turbine engine as claimed in claim 1 wherein the shaft has a bearing shoulder and said bleed of air under pressure is provided from the compressor to the bearing shoulder in opposition to the forward thrust transmitted by the shaft.

5. A gas turbine engine as claimed in claim 1 wherein a bleed of air under pressure is provided from the compressor to a plurality of bearings on the shaft, to form an air cushion or air film at each, with no substantial contact between moving parts when pressure has built up in the compressor.

6. A gas turbine engine as claimed in claim 5 comprising a continuous chain of interconnected air passageways from the compressor to an exhaust outlet, leading the pressurized bearing air through the said bearings in sequence.

7. A gas turbine engine as claimed in claim 5 wherein the compressor is followed coaxially by a combustion chamber or ring of combustion chambers, and an exhaust turbine, and the said air cushion or air film bearings include radial location bearings for the shaft at its forward end before the compressor, at an intermediate position between the compressor and the combustion chamber or chambers, and between the combustion chamber or chambers and the turbine.

8. A gas turbine engine as claimed in claim 1 wherein the axial shaft is titanium nitride coated in the regions of the shaft which may come into contact with fixed bearings during start up and shutdown.

9. A gas turbine as claimed in claim 8 wherein the said fixed bearings are of graphite.

10. A gas turbine engine as claimed in claim 1 wherein an air film bearing is provided with means for initiating airflow in the event that, on start up, there is contact between two faces which would otherwise prevent any air ingress to drive the two faces apart.

11. A gas turbine as claimed in claim 10 wherein the said means comprise a groove in a said face.

12. A gas turbine engine comprising a rotary axial-flow air compressor mounted on an axial shaft for generating a bleed of air under pressure, and a turbine, said axial shaft having a forward end in advance of the air compressor and a rearward end, said forward end being defined by a forward facing surface located in a void in advance of the air compressor to form an air thrust bearing, said turbine being located between the compressor and the rearward end of the axial shaft, a pressurized air cushion maintained by said bleed of air from the compressor to the thrust bearing, said pressurized air cushion opposing only the forward thrust of the cornpressor transmitted by the axial shaft, said axial shaft having a degree of forward end float to allow said forward facing surface to move axially within said void to compensate for relative changes between the air pressure in the air cushion and the forward thrust transmitted by the shaft, and whereby an increase in said air cushion thickness is accompanied by an increase in venting from the air cushion.

13. A gas turbine engine as claimed in claim 12 wherein the said forward facing surface is the forward end face of the axial shaft and the air cushion is in an axial void ahead of the shaft.

14. A gas turbine engine as claimed in claim 12 wherein the shaft has a bearing shoulder and said bleed of air under pressure is provided from the compressor to the bearing shoulder in opposition to the forward thrust transmitted by the shaft.

15. A gas turbine engine as claimed in claim 12 wherein a bleed of air under pressure is provided from the compressor to a plurality of bearings on the shaft, to form an air cushion or air film at each, with no substantial contact between moving parts when pressure has built up in the compressor.

16. A gas turbine engine as claimed in claim 15 comprising a continuous chain of interconnected air passageways from the compressor to an exhaust outlet, leading the pressurized bearing air through the said bearings in sequence.

17. A gas turbine engine as claimed in claim 16 wherein the compressor is followed coaxially by a combustion chamber or ring of combustion chambers, and an exhaust turbine, and the said air cushion or air film bearings include radial location bearings for the shaft at its forward end before the compressor, at an intermediate position between the compressor and the combustion chamber or chambers, and between the combustion chamber or chambers and the turbine.

18. A gas turbine engine as claimed in claim 12 wherein the axial shaft is titanium nitride coated in the regions of the shaft which may come into contact with fixed bearings during start up and shutdown.

19. A gas turbine engine as claimed in claim 12 wherein an air film bearing is provided with a groove in said face for initiating airflow in the event that, on start up, there is contact between two faces which would otherwise prevent any air ingress to drive the two faces apart.

* * * * *